Sept. 9, 1969  L. H. JORDAN ET AL  3,466,410
VACUUM OPERATED TIMER SWITCH
Filed Jan. 19, 1968
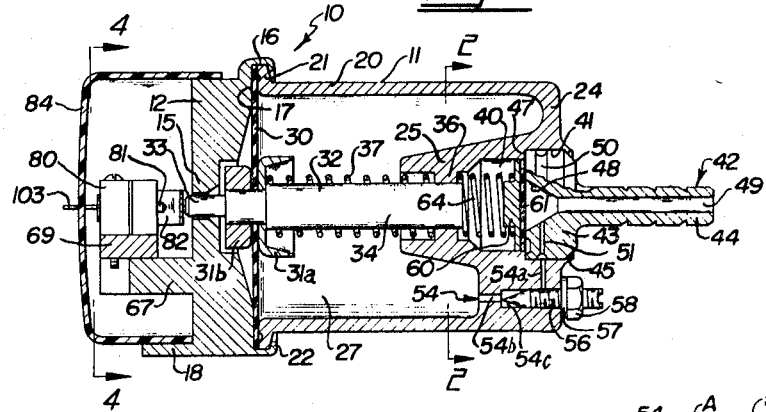
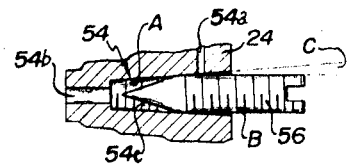
Fig. 3.
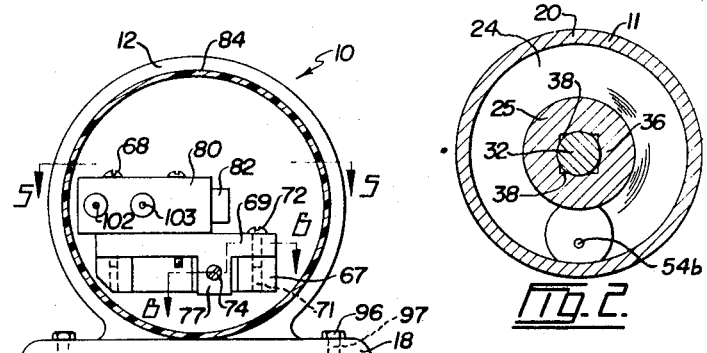
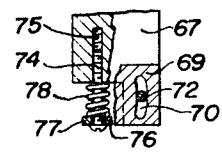
Fig. 6.
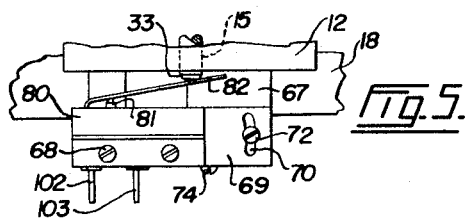
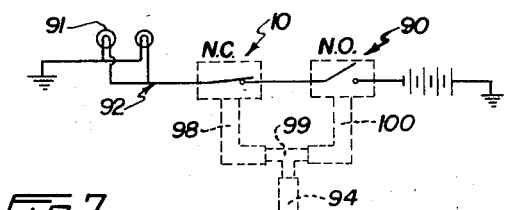
Fig. 7.
INVENTORS
LESLIE H. JORDAN
JOHN ARDEN
BY
Fetherstonhaugh & Co.
ATTORNEYS United States Patent Office 3,466,410
Patented Sept. 9, 1969

3,466,410
VACUUM OPERATED TIMER SWITCH
Leslie H. Jordan, 2021 E. Broadway, Vancouver, British Columbia, Canada, and John Arden, 6049 Portland Ave., Burnaby, British Columbia, Canada
Filed Jan. 19, 1968, Ser. No. 699,130
Int. Cl. H01h 35/40
U.S. Cl. 200—83                        7 Claims

ABSTRACT OF THE DISCLOSURE

A switch for controlling an electric circuit and having a vacuum chamber enclosing a diaphragm which is deflected to actuate electrical contacts when air is evacuated from the chamber, with means for delaying evacuation of the chamber for a selected period of time and other means for controlling the level of vacuum which will actuate the contacts.

Background of the invention

This invention relates to a vacuum operated, delayed action, timing device which is particularly suited for use in controlling an electric circuit of a motor vehicle.

Electric switches have been designed for use on automobiles and trucks for controlling stop or warning lights of the vehicle. The purpose of such switches is to provide a suitable warning to the driver of a following car of a sudden slow down of the leading vehicle. Such warning is particularly desirable on the highway when the traffic is moving along at high speed and a sudden reduction in speed of one car may go unnoticed by the driver of a following car so as to cause a rear-end collision. One switch specifically designed for the aforementioned purpose is operated by intake manifold vacuum so that, when the driver takes his foot off the accelerator and a predetermined level of vacuum is developed in the intake manifold, rear warning lights on the car are energized to indicate the vehicle is decelerating. A switch operated in this manner functions well under most normal circumstances but, when the car is descending a long hill, the driver likely will have his foot off the accelerator a greater-than-usual length of time and sufficient vacuum will be generated in the intake manifold to keep the warning lights on continuously and for such a lengthy period that the driver of a following car will be confused as to whether the leading car is coming to a full stop or is merely driving at a constant but reduced rate of speed. It is therefore desirable that the warning lights be turned off after a suitable interval and hitherto this has not been possible when the above described speed change indicator switch is used.

Summary of the invention

The present invention provides a vacuum operated timer switch for breaking an electric circuit which is energized by a separate speed change indicator switch operated from the same source of vacuum. Thus, the two switches can be connected to the intake manifold of an automobile for example, whereby the timer switch will function a selected interval after the indicator switch is closed, but only if the circuit to the rear warning lights remains energized for too long a period. The indicator switch closes and opens normally to turn the warning lights on and off, and if the warning lights do not remain on for too long a period, the timer switch may not come into operation at all. However, if the warning lights have been on for a predetermined period, the timer switch may cut in and override the indicator switch whereupon the circuit will be broken. Once the vacuum operating both switches is removed, the timer switch returns to normally on position immediately so as not to interfere with the normal operation of the indicator switch. The delayed action interval of the timer switch can be varied with precision and by a simple and extremely fine adjustment which does not require special tools or a high degree of mechanical skill. By another similar adjustment, the switch can be regulated to respond only to a predetermined high level of vacuum.

Brief description of the drawings

FIGURE 1 is a longitudinal section of a preferred embodiment of the vacuum operated timer switch, in accordance with this invention, FIGURE 2 is a section taken on the line 2—2 of FIGURE 1, FIGURE 3 is a schematic view of the metering screw, FIGURE 4 is a section taken on the line 4—4 of FIGURE 1, FIGURE 5 is a section taken on the line 5—5 of FIGURE 4, FIGURE 6 is a section taken on the line 6—6 of FIGURE 4, and FIGURE 7 is a wiring diagram showing the switch in a typical position of use.

Description of the preferred embodiments

In the drawings, the numeral 10 indicates generally a switch comprising a casing 11 which has a base plate 12. The circular base plate 12 has a central opening 15 and a rim 16 which overhangs the inner face 17 of said plate. Mounting lugs 18 are integrally formed on the base plate 12.

Casing 11 has a cylindrical wall 20 which is provided with an end flange 21. This flange fits beneath the rim 16 and is locked to the base plate 12 by an inwardly rolled free edge 22 of said rim. The casing 11 has an end wall 24 on which an inwardly directed sleeve 25 is integrally formed. A vacuum chamber 27 is provided within the cylindrical wall 20 of the casing.

The chamber 27 is sealed off at one end by a diaphragm 30 which is clamped between the face 17 of the base plate and the flange 21 of the cylindrical wall. Diaphragm 30 is a thin, flexible disc of a rubber-like material, the disc being secured by a cup 31a and a collar 31b to a centrally disposed stem 32. Stem 32 projects through the diaphragm 30 to provide a short outer end 33 which slidably projects through the central opening 15 in the base plate, and a relatively long inner end 34. The sleeve 25 has flange bearing 36 and the end 34 of the stem is slidably supported by this bearing. A compression spring 37 is fitted to the stem between the cup 31a and the flange bearing 36, the spring resisting movement of the stem 32 towards the end wall 24 of the casing. Referring to FIGURE 2, the bearing 36 will be seen to have a number of longitudinal notches 38 which allow a free passage of air between said bearing and the stem end 34.

Sleeve 25 is provided, at mid-length, with a valve chamber 40 and, near the wall 24, with a recess 41. Mounted in the recess 41 is an adaptor 42 comprising a head 43 and an outwardly projecting tube 44. The cylindrical head 43 is a close fit within the recess 41 and is held therein by an inwardly rolled flange 45 formed on the casing wall 24. The adaptor head 43 has an inner face 47 in which a tapered port 48 is formed, the port communicating with a bore 49 which extends through the head and the stem of the adaptor. Head 43 is provided with an annular groove 50 as well as a radial aperture 51 which connects said groove to the port 48.

The casing end wall 24 is drilled to provide a restricted passage 54 which places the vacuum chamber 27 in communication with the valve chamber 40 through the groove 50, aperture 51 and port 48. Means is provided for varying the size of the restricted passage whereby to regulate the rate of flow of air therethrough and, to this end, passage 54 is provided with a cavity portion 54a which registers with the groove 50, and also with a vacuum chamber portion 54b which is counterbored to provide said passage with an intermediate portion 54c. Portion 54c is suitably threaded to receive a threaded metering screw 56. The metering screw 56 is fitted with a gasket 57 and is adapted to be locked in adjusted position by a nut 58. It will be noted that the portion 54c and screw 56 are shaped to provide progressively increasing clearance therebetween from the portion 54b to the portion 54a. As shown schematically in FIGURE 3, this clearance can be provided by removing the crests of the female threads A so that these threads taper inwardly to the required slight extent. The male threads B on the substantially cylindrical screw 56 then define with threads A, a clearance indicated by the letter C in FIGURE 3. Clearance C is exaggerated for purposes of illustration and obviously the same effect could be achieved by tapering the male threads rather than the female threads or, alternatively, to taper both. Regardless of how the tapering is done, it will be apparent the screw 56 can be advanced to reduce the size of the restricted passage 54 or retracted to increase the passage size. Thus, the flow of air through the restricted passage 54 can be controlled within much smaller limits than could be achieved by a conventional needle valve or the like. The extremely fine adjustment of the size of the passage 54 enables the timing of the switch 10 to be increased or decreased by a matter of seconds.

Mounted within the vacuum chamber 40 is a disc check valve 60, preferably provided on one face with a rubber seal 61, which valve is held in contact with the face 47 of the adaptor by a light compression spring 64. Thus, the port 48 normally is closed by the disc check valve 60 but the disc is easily moved to open position by a slight increase of air pressure within said port over the pressure within the vacuum chamber 40.

The base plate 12 of the casing is provided with an outwardly projecting bracket 67 and secured to this bracket, by means of a pivot pin 68, is an arm 69. Pin 68 extends through the left end of the arm 69, as viewed in FIGURE 4, and the opposite, or right end of said arm, has a short arcuate slot 70, see FIGURES 5 and 6. Extending through this slot to enter a threaded opening 71 (FIGURE 4) in the bracket 67, is a locking screw 72. Another screw 74 is threaded into an opening 75 (FIGURE 5) in the outer edge of the bracket 67, this screw slidably extending through an enlarged opening 76 formed in a lug 77 depending from the underside of the arm 69. A compression spring 78 is fitted to the screw 74 between the lug 77 and the adjacent edge of the bracket 67.

Mounted on the arm 69 is a conventional micro-switch 80 having a spring-pressed operating plunger 81. A leaf spring 82 is carried by the normally closed switch 80, this spring extending over the plunger 81 and across the base plate 12 so that its free end is engaged by the outer end 33 of the stem 32. Preferably, the micro-switch 80 and its associated parts are covered by a plastic cap 84 which is removably secured in a suitable manner to the base plate 12.

From the foregoing, it will be apparent that switch means comprising the electric switch 80 is supported by the arm 69 so that said switch can be pivoted towards or away from the base 12 and can be locked in any selected position. When the stem 32 is moved inwardly far enough by the flexing diaphragm, leaf spring 82 is allowed to bend so that the operating plunger 81 will move to open the micro-switch 80. By adjusting the position of the switch 80 in this manner, the switch can be set to operate in response to any desired movement of the stem and diaphragm. Thus, means is provided for selecting a predetermined level of vacuum which must be reached within the vacuum chamber 27 before the switch 80 will be opened.

The vacuum operated timer switch 10 particularly is adapted for use in conjunction with a speed change indicator switch indicated generally by the numeral 90 and shown diagrammatically in FIGURE 7 only. Switch 90 is a vacuum controlled switch of the type used to control the rear warning lights 91 of a vehicle and for this purpose, said lights are included in a suitable circuit 92. Switch 90 normally is connected by a flexible hose 94 to the intake manifold of a vehicle. Briefly, the operation of the normally open switch 90 is as follows:

If the vehicle fitted with the switch is travelling along a road and the driver suddenly takes his foot off the accelerator, the vacuum in the engine manifold instantly rises. If the manifold vacuum rises to a predetermined level, switch 90 is actuated to cause the warning lights 91 to go on. This warns the driver of a following car that the leading car is decelerating so that he can adjust his speed accordingly. When the accelerator of the leading vehicle is again depressed, the vacuum drops below the predetermined level and the switch 90 opens to turn off the lights 91.

Timer switch 10 is designed to be connected in series with the indicating switch 90 as shown in FIGURE 7. The casing 11 is secured to a suitable part 95 of the vehicle by bolts 96 which are entered through openings 97 in the mounting lug 18. A hose 98 is secured to the tube 44 of the adaptor and conveniently this hose may be connected by a T fitting 99 and branch hose 100 to the hose 94 of the switch 90. Hose 94 would then connect the switches 10 and 90 to a common source of vacuum which, in this instance, is the intake manifold of the vehicle.

Appropriate contacts 102 and 103 of the micro-switch 80 are connected in the circuit 92 and the micro-switch is adjusted to select a predetermined level of vacuum at which said switch will be operated. To carry out such an adjustment, the screw 72 is backed off a few turns and the arm 69 is swung about the pivot pin 68 to dispose said arm at a suitable angle relative to the base plate 12, whereupon the locking screw 72 is again tightened. At this time, the leaf spring 82 is in contact with the end 33 of the stem and continues to hold the plunger 81 in closed position. It is then necessary for the stem 32 to move a selected distance before the micro-switch 80 will open. To bring about the required movement of the stem 32, the diaphragm 30 must flex a corresponding distance and this distance is determined by the level of vacuum within the chamber 27. Thus, it is possible to set the timer switch 10 so that it will respond only to a predetermined level of vacuum. This vacuum level normally is set quite high to ensure that the micro-switch is not operated by minor fluctuations in the level of vacuum.

The metering screw 56 is also adjusted as required to control the length of time needed to evacuate the chamber 27 through the restricted passage 54. When the screw 56 is advanced as far as it will go into the opening 54c, only a very slight clearance is provided between the male and female threads of these two parts. This reduces the restricted passage 54 to a minimum with the result that quite a long time is required to evacuate the chamber 27. By backing off the screw 56 a partial turn, the clearance between the threads of the opening 54c and the screw can be increased very slightly and the period required for air within the chamber 27 to flow through the restricted passage 54 is shortened accordingly. Thus, the period of delay before which the switch 10 will come into operation, is readily controlled within extremely fine limits by means of the very slight taper C between the threads A and B of the portion 54c and the metering screw 56.

Assuming the vehicle fitted with both switches 10 and 90 is moving along the road, the driver occasionally will lift his foot off the accelerator to cause a buildup of vacuum within the intake manifold. This increased vacuum is sensed by the switch 90 which turns the lights 91 on and off as described previously. Any variation in intake manifold pressure is also sensed by the switch 10 and this causes the check valve 60 to float or to continuously open and close and thereby balance the pressure between the port 48 and the valve chamber 40. It will be noted the chambers 27 and 40 are in communication with one another through the notches 38 so that pressure differential between these two chambers is never very large as long as the check valve 60 continues to open and close. The diaphragm 30 may be flexed slightly at this time to move the stem 32 endwise but the spring 82 compensates for this slight endwise movement of the stem and the switch 80 remains closed. Thus, the rear warning lights 91 are operated solely by the switch 90 at this time. However, if the car is descending a long hill, the high level of vacuum will be maintained for a sufficiently long period to bring switch 10 into operation. The first sudden rise in vacuum above the predetermined level causes the check valve 60 to close and seal off the port 48. Air within the chamber 27 then flows through the restricted passage 54, thence into the annular groove 50, and through the aperture 49 to the port 48. In this manner, the chamber 27 is evacuated over a period which is determined by the setting of the metering screw 56. The level of vacuum within the chamber 27 eventually rises to a point where the diaphragm 30 will flex sufficiently to move the stem endwise the required distance to operate the micro-switch 80. Micro-switch 80 is opened when the leaf spring 82 swings towards the base plate 12 a distance sufficient to let the spring-pressed plunger 81 move outwardly so as to open said micro-switch. Thus, the switch 10 overrides the switch 90 and turns off the warning lights 91. When the accelerator of the vehicle is again depressed, the level of vacuum falls whereupon switch 90 will open and switch 10 will close. It will be noted that once the valve 60 opens, the vacuum within the chamber 27 is relieved almost immediately through the notches 38. The switch 10 is then returned to its normally closed position without delay so as not to interfere with any subsequent operation of the switch 90. Thus, the switch 90 will control the circuit 92 during normal operation of the car and the switch 10 will come into operation only if intake manifold pressure is maintained at a predetermined high level for a selected length of time.

The vacuum operated timer switch has been described in use in conjunction with a speed change indicator switch 90 but it will be appreciated that switch 10 can be used equally as well by itself to control circuits other than the one indicated by the numeral 92. By connecting the appropriate contacts of the micro-switch 80 in a circuit, the device can be used to make or break that circuit after a suitable time delay and in response to a suitable level of vacuum.

We claim:

1. A vacuum operated timer switch comprising a casing having a vacuum chamber, a diaphragm extending across the casing to seal off an end of the vacuum chamber, said casing having a port communicating with the vacuum chamber and adapted to be connected to a source of vacuum, a check valve mounted in the casing to open and close the port, said casing having a restricted passage connecting the vacuum chamber to the port, switch means adapted to be included in an electric circuit, a stem operatively connecting the diaphragm to the switch means, said check valve closing in response to a rise in level of vacuum at the source whereby the vacuum chamber is evacuated at a predetermined rate through the restricted passage thereby causing the diaphragm to flex and actuate the switch means.

2. A vacuum operated timer switch as claimed in claim 1, and means varying the size of the restricted passage controlling the time interval between the rise in level of vacuum at the source and actuation of the switch means.

3. A vacuum operated timer switch as claimed in claim 1, and means adjusting the switch means whereby the vacuum chamber must be evacuated to a predetermined level of vacuum before the switch means is actuated.

4. A vacuum operated timer switch for an electric circuit comprising a casing having a vacuum chamber, a port communicating with the vacuum chamber and adapted to be connected to a source of vacuum, and a restricted passage connecting the vacuum chamber to the port; a metering screw fitted to the casing to control air flow through the restricted passage, a check valve mounted in the casing to open and close the port, a spring biasing the check valve to close the port, a diaphragm extending across the casing to seal off an end of the vacuum chamber, a stem secured to the diaphragm, a spring on the stem to resist flexing movement of the diaphragm into the vacuum chamber, switch means included in the electric circuit and being operatively connected to the stem, said check valve being adapted to close in response to a rise in the level of vacuum at the source whereby the vacuum chamber is evacuated at a predetermined rate through the restricted passage thereby causing the diaphragm to flex and actuate the switch means.

5. A vacuum operated timer switch as claimed in claim 4, in which said restricted passage has a vacuum chamber portion, a port portion, and a threaded intermediate portion; said metering screw having threads engaging the threads of the intermediate portion, said intermediate portion and the metering screw being shaped to provide progressively increasing clearance between the threads thereof from the vacuum chamber portion to the port portion.

6. A vacuum operated timer switch as claimed in claim 4, in which said switch means comprises an electric switch mounted on the casing near an end of the stem, said electric switch having an operating plunger and a leaf spring engaging said operating plunger and the end of the stem, and means for selectively adjusting the position of the electric switch relative to the casing whereby a predetermined level of vacuum must be reached within the vacuum chamber before the electric switch is actuated.

7. A vacuum operated timer switch for an electric circuit having a speed change indicator switch adapted for connection to a source of vacuum whereby a rise in vacuum above a predetermined level will operate said indicator switch, said timer switch comprising a casing having a vacuum chamber, a port communicating with the vacuum chamber and adapted to be connected to the same source of vacuum as the indicator switch, and a restricted passage connecting the vacuum chamber to the port; a check valve mounted in the casing to open and close the port, switch means included in the electric circuit, a stem operatively connecting the switch means to the diaphragm, said check valve closing in response to the rise in vacuum above the predetermined level which operated the indicator switch, said vacuum chamber being evacuated through the restricted passage at a predetermined rate after the check valve is closed whereby the diaphragm is flexed to actuate the switch means.

References Cited

UNITED STATES PATENTS

| | | | |
|---|---|---|---|
| 3,040,842 | 6/1962 | Charbonneau | 200—34 |
| 3,045,076 | 7/1962 | Gaylord | 200—34 |
| 3,246,094 | 4/1966 | Zaske et al. | 200—83 |

H. O. JONES, Primary Examiner

PO-1050
(5/69)

UNITED STATES PATENT OFFICE
CERTIFICATE OF CORRECTION

Patent No. 3,466,410          Dated September 9, 1969.

Inventor(s) LESLIE H. JORDAN and JOHN ARDEN

It is certified that error appears in the above-identified patent and that said Letters Patent are hereby corrected as shown below:

Column 3, line 2, delete "cavity" and substitute -- port --; lines 31 and 38, delete "vacuum" and substitute -- valve --. In column 6, line 50 after "chamber", insert -- a diaphragm extending across the casing to seal off an end of the vacuum chamber, --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents